April 21, 1942.   C. B. ANDREWS ET AL   2,280,141
DREDGE BUCKET
Filed Nov. 18, 1939   2 Sheets-Sheet 1
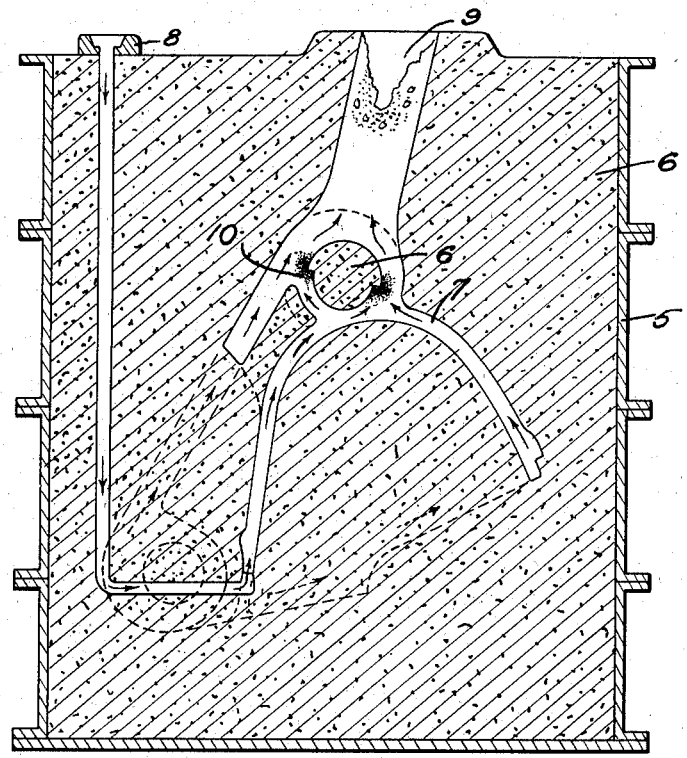
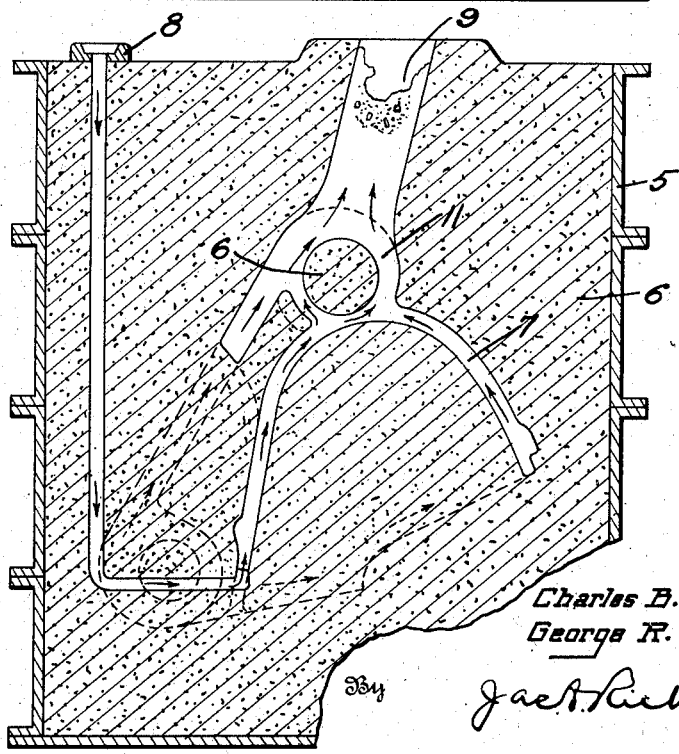
Inventors
Charles B. Andrews
George R. Hanks
By Jack Richmond
Attorney April 21, 1942. C. B. ANDREWS ET AL 2,280,141
DREDGE BUCKET
Filed Nov. 18, 1939 2 Sheets-Sheet 2

Inventors
Charles B. Andrews
George R. Hanks
By
Attorney

Patented Apr. 21, 1942

2,280,141

UNITED STATES PATENT OFFICE 2,280,141

DREDGE BUCKET

Charles B. Andrews, High Bridge, and George R. Hanks, Clinton, N. J., assignor to Taylor-Wharton Iron and Steel Company, High Bridge, N. J., a corporation of New Jersey Application November 18, 1939, Serial No. 305,192

5 Claims. (Cl. 37—191)

In the production of chain dredge buckets it has been customary for many years to design the rear eyes with lengthwise ranging offsets which act as stops or abutments for half round bushings and prevent them from turning. As bushing stops, the shouldered or offset portions serve their purpose when new, but, when worn, fail to prevent rocking of the bushing. Moreover, they are vexatious to foundries because the resulting inequality of metal sections not infrequently causes porous spots, which lead to immediate or eventual cracking of the rear eyes and failures of chain dredge buckets in service.

The objects of the invention are to prolong the useful life of chain dredge buckets by obviating conditions which produce unsound metal in the rear eyes; to provide rear eyes with symmetrical or full round bushing seats; to provide bushings adapted to said bushing seats and capable of ready application and removal; to provide bushings which will be frictionally held against turning movement; to provide bushing sections which will be positionally interchangeable in the bushing seat thereby reducing the weight of unscrapped metal; to further reduce the weight of scrapped metal by providing a bushing assembly comprising arcuate bushing sections whereof one is normally a load-carrying member, the sections being adjustable in situ to compensate for wear, and the assembly being circumferentially completed by bushing adjuncts normally not subjected to wear and, hence, effective as metal-saving devices; to further reduce the weight of scrapped metal by providing a bushing assembly comprising arcuate bushing sections spaced at one point by wedge locks and at another point by wedge locks or alternatively by a simple filler piece; and to provide a simple form of wedge lock whereby the bushing sections may be readily released and removed.

The nature, characteristic features and scope of the invention will be more readily understood from the following description taken in connection with the accompanying drawings, forming a part hereof, wherein—

Figure 1 is a sectional view of a mold and shows how the rear eye may be inherently weakened by the presence of porous areas when cast with offsets or abutments for half round bushings.

Fig. 2 is a similar view showing uniformly sound metal in the rear eye stock when the bushing seat is cast symmetrically round.

Fig. 1 represents in a graphical way what happens to the structure of the rear eye when cast from a pattern which includes the conventional bushing seat, the shoulders of which serve as stops or abutments for the conventional half round bushing. 5 represents the mold, 6 the sand, 7 the metal, and the arrows indicate how the metal flows from the gate 8, through the mold cavities and to the riser 9 serving as a feed to counteract shrinkage.

It is obvious to those skilled in the art that the shoulders 10 tend to dam or obstruct metal flow and that the resultant agitation of the metal operates to entrap dirt and gases which causes porous spots and other conditions of unsound metal. It follows that the conditions of unequal sections of metal and of inherently unsound metal are decided liabilities and, in buckets which fail in service, it is generally found that the breakage occurred at points adjacent to the corners of the bushing seats and the fractures show shrinkage and trapped gases and dirt.

Fig. 2 shows how we provide uniformly sound metal throughout the rear eye by providing a symmetrically full round bushing seat 11 whereby there are no offsets or sharp corners to obstruct metal flow and trap gases and dirt. By simplifying the casting of the rear eye we not only lessen the problems of the foundry and lengthen the wear life of buckets, but also simplyify the work of changing bushings and reduce operating costs.

Figure 4:
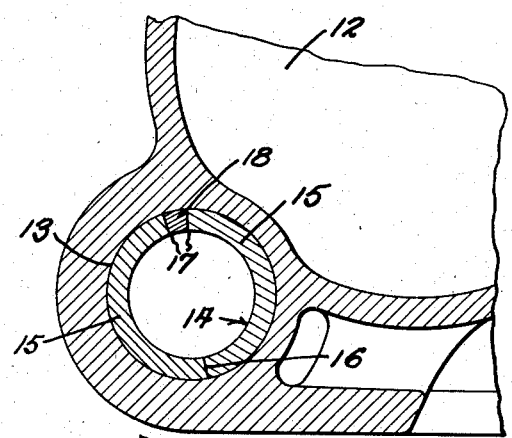
Fig. 4 is a sectional view of the rear eye portion of a chain dredge bucket equipped with a sectional bushing in accordance with our invention.

Referring to Fig. 4, 12 represents a chain dredge bucket, the rear eye of which is formed with a symmetrically round bushing seat 13 adapted for cooperation with a multiple part round bushing generally indicated at 14. For convenience in application and removal, and to minimize the weight of metal scrapped when worn out, the bushing is divided longitudinally into coincident sections 15. One line of division, as at 16, is characterized by the relatively finished or close fit of the abutting edges and the other line of division is defined by a gap 17.

Figure 3:
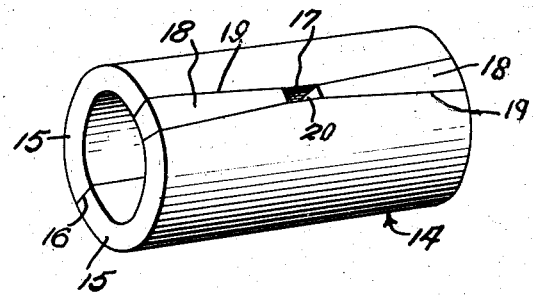
Fig. 3 is a perspective view of our improved two-part bushing and its complemental wedges.

The bushing is held against turning movement by a frictional fit with relation to the seat. One way of accomplishing this is by expanding the bushing by means operatively disposed with relation to the walls of the gap. Preferably we use a pair of wedges 18, introducible, respectively, from opposite ends of the bushing, the edge walls of the gap having coordinate tapered surfaces 19. As shown in Fig. 3 there is a space or pocket 20 between the proximate ends of the wedges to allow for clearance and takeup and also to provide for ready access and application of a hooklike pulling member or a driving member for alternative use in releasing and ejecting the wedges.

Figure 5:
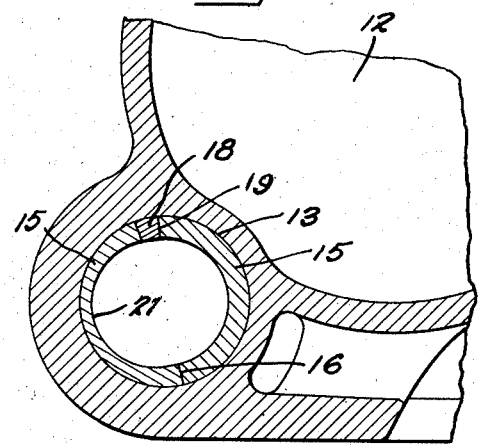
Fig. 5 is a view showing worn section ready to be shifted.
Figure 6:
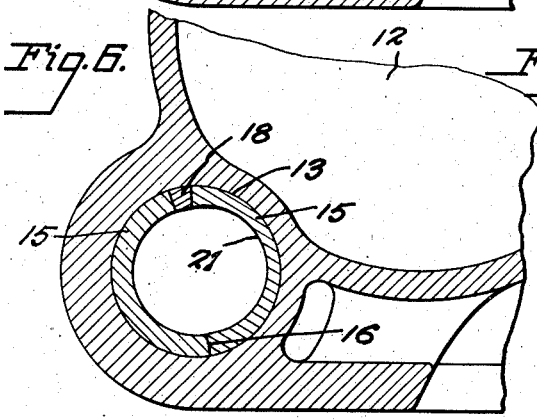
Fig. 6 shows how bushing sections have been shifted in order to put the burden of wear on the unworn mate.

After the bushing section subjected to load is worn to the point where it is no longer serviceable for load sustaining purposes, the wedges are withdrawn, and the bushing sections are interchanged in position so as to present the unworn section to the load. For example, Fig. 5, shows how one of the bushing sections has been worn away as at 21; and Fig. 6 shows how the bushing sections have been shifted to cause the unworn section to occupy the place vacated by the worn section.

Figure 7:
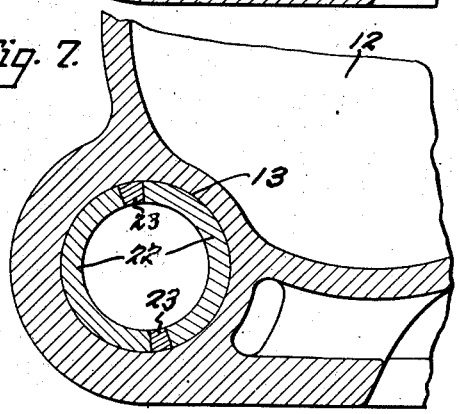
Fig. 7 is a sectional view of a rear eye equipped with coincident bushing sections and diametrically opposed sets of wedges.
Figure 8:
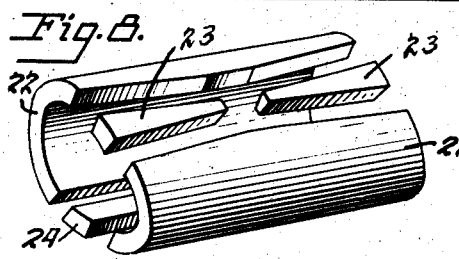
Fig. 8 is a perspective view of the bushing sections, Fig. 7, showing wedges in one gap and an untapered filler-piece in the other gap.

Fig. 7 is a modification in which coincident bushing sections 22 are constructed and arranged to cooperate with diametrically opposed spreaders or locking provisions. Such locking provisions may comprise, as before, reversely disposed wedges 23; or, as in Fig. 8, wedges 23 at the top and an untapered filler-piece 24 in the gap at the bottom. By this means the weight of the bushings and the amount of metal to be scrapped can be held to a minimum because the spreaders or spacing provisions constitute a substantial part of the circle and yet suffer no appreciable wear so that they can be used over and over again with bushing section replacements.

Having described the invention, what is claimed as new is:

1. A chain dredge bucket having a rear eye comprising substantially equalized cast metal having a symmetrically formed full round bushing seat, said metal being free from porous spots and being otherwise sound, a bushing having a conforming fit and comprising bushing sections adapted and arranged to be positionally interchanged by rotative movement to compensate for wear, and means for relatively securing the bushing in any adjusted position.

2. A chain dredge bucket having a rear eye provided with a full round bushing seat, a bushing comprising complemental bushing sections externally shaped to fit the seat and means to establish circumferential continuity of the parts and releasable to permit the bushing sections to be moved through and arc whereby the worn load-sustaining section is caused to exchange places with an unworn section.

3. A chain dredge bucket having a rear eye provided with a full round bushing seat, bushing sections having a rotative fit with relation to the seat and, when so applied, presenting circumferential interruptions, and means to establish circumferential continuity of the parts and comprising filling provisions for the interruptions, said provisions being effective to establish a binding fit of the bushing with relation to its seat, said means being releasable to permit the bushing sections to be moved through an arc whereby the worn load-sustaining section is caused to exchange places with an unworn section.

4. A chain dredge bucket having a rear eye provided with a full round bushing seat, a bushing adapted to the seat and capable of rotative adjustment therein, said bushing comprising segments whereof one is positioned to suffer the load and whereof another is a spare to supplant the first segment when it becomes unfit to carry the load, and filling provisions to complete the circumferential continuity of the bushing and effective to secure the bushing with relation to its seat and releasable at will to permit adjustment of the segments as and for the purpose indicated.

5. A chain dredge bucket having a rear eye provided with a full round bushing seat, a bushing adapted to the seat and capable of rotative adjustment therein, said bushing comprising segments whereof one is positioned to suffer the load and whereof another is a spare to supplant the first segment when it becomes unfit to carry the load, one pair of adjacent edge walls of two segments having a relatively close fit and other edge walls defining a gap, and gap filling provisions including wedge reacting devices effectively mounted in opposite ends of the gap.

CHARLES B. ANDREWS.
GEORGE R. HANKS.